May 16, 1967  M. B. LEVITT ET AL  3,319,474
RATE SENSITIVE LIMIT SWITCH
Filed May 27, 1963
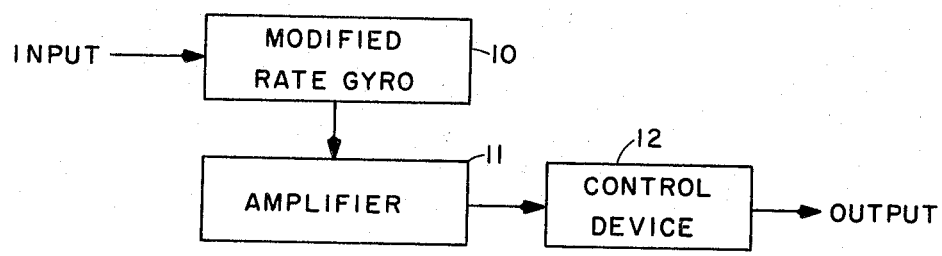
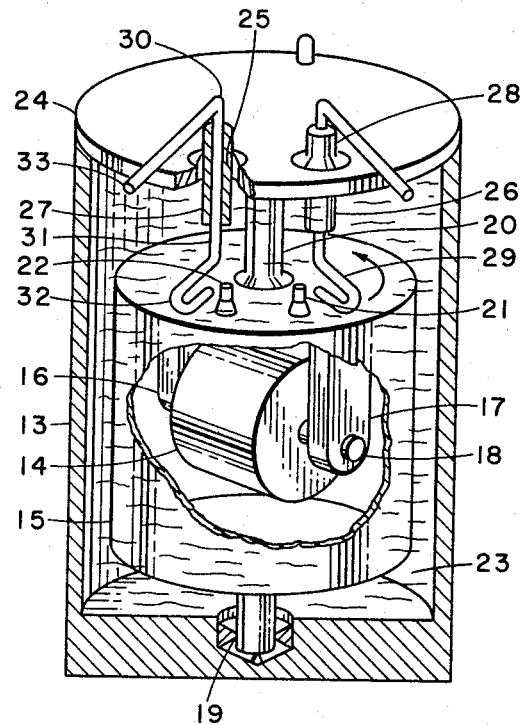
INVENTORS
MYRON B. LEVITT
BY JOHN J. CIRILLO

United States Patent Office 3,319,474
Patented May 16, 1967

3,319,474
RATE SENSITIVE LIMIT SWITCH
Myron B. Levitt and John J. Cirillo, Plainview, N.Y., assignors to Fairchild Camera and Instrument Corporation, a corporation of Delaware
Filed May 27, 1963, Ser. No. 283,241
9 Claims. (Cl. 74—5.6)

This invention relates generally to the field of limit switches. More particularly, the invention relates to a limit switch employing a suitably modified rate gyroscope as an operating component, the switch being capable of accurate adjustment after assembly to provide the desired degree of control precision.

The unit to be described is capable of general application wherever it is necessary or desirable to know when an angular rate reaches a predetermined point. One typical application is as a safety device to limit the external torque applied to a torque responsive device, more particularly, an inertial gyroscope. A common problem in this field is to provide a mechanism for protecting a complicated and expensive inertial gyroscope from damage as a result of an applied angular rate in excess of the gyroscope's designed tolerance.

A major operative portion of the limit switch of the invention is a rate gyro, i.e., one in which an externally applied angular rate input tends to rotate the gyro gimbal against a restraining mechanism such as a linear spring. The amount of force exerted by the restraining mechanism in balancing the gimbal rotation can be utilized to measure the angular rate. In the example to be described the linear spring is a torsion bar.

The present invention uses such a rate gyro, suitably modified, as part of a combination of elements which, acting together, provide a useable signal when the input angular rate reaches or exceeeds a predetermined maximum. By virtue of this approach the control mechanism is separate from the controlled device but is responsive to the identical angular rate input to which the controlled device is responsive and accordingly, can be made much simpler and more rugged avoiding, as it does, the neeed for complicated, interpretive circuitry which frequently requires use of part of the output of the controlled device itself.

The use of a small rate gyro as a component of control or limit switch apparatus to protect a larger more expensive gyro presents certain initial problems which must be overcome. For example, the derivation or production of signals within the rate gyro housing must be accomplished within the silicone damping fluid. It is, however, believed that the very characteristics which make a fluid a good damping medium also render it susceptible to breakdown even at a relatively low voltage and current levels. Therefore, if recourse is had to signal derivation within the gyro housing the signal levels employed must be kept below the critical breakdown level. In addition, since the precision of the limit switch is critical, the adjustment of the contacts which will determine the rate limit beyond which the controlled device is to be protected, must be set with precision and, as a practical matter, must be adjusted after the small rate gyro component is sealed. This presents certain problems as will be appreciated since the rate gyro is filled with damping fluid and hermetically sealed.

Accordingly, it is an object of this invention to provide an improved limit switch.

It is a further object of this invention to provide a limit switch which is particularly adapted to establish a limit to the angular rate of an external input which may affect a controlled device.

It is a further object of this invention to provide a limit switch for controlling an inertial gyroscope which solves the problems encountered by the prior art.

Other and further objects and advantages of the invention will become clear when the following description is read in conjunction with the accompanying drawings. The scope of the invention will be pointed out with particularity in the appended claims.

Briefly stated, the limit switch of this invention includes a rate gyro of the type having a driven gyro wheel and a torsion bar restrained gimbal. An angular rate input applied along the input axis tends to rotate the gimbal about the gimbal axis against the torsion bar restraint. The wheel and gimbal assembly is mounted in a sealed housing which is filled with a damping fluid. A pair of contact arms extend through the housing, located so that each is normally free of an associated contact pin fixed to the gimbal. The contact arms are positionable, after the housing is sealed, so that one or the other will touch its associated contact pin when the applied angular input reaches or exceeds any desired rate in either direction. The portion of each contact arm external to the housing is connected to a control device through an amplifier so that the signal level within the housing need not exceed the voltage/current breakdown level of the damping fluid.

In the drawings:

FIGURE 1 is a block diagram illustrating the connection between the modified rate gyro portion of the limit switch and the balance of the circuitry with which it is employed.

FIGURE 2 is a sectional perspective having a broken out section of a simplified representation of a rate gyro unit modified for use as a limit switch component.

Referring now to FIGURE 1, the limit switch of this invention is shown in its simplest form to provide a general orientation for the detailed description of FIGURE 2. In FIG. 1 a modified rate gyro 10 is shown, capable of receiving an input rate and, on appropriate occasions, supplying a signal to amplifier unit 11. Amplifier 11, in turn, affects control device 12 altering the state of the output therefrom. In actual working embodiments of the invention, control device 12 has typically been a relay, and it has been found advantageous to arrange the circuit so that the contacts of the relay used as control device 12 are normally closed. When the output from amplifier 11 changes in response to an angular rate input applied to modified rate gyro 10 equal to or greater than the critical rate, the altered output from amplifier 11 causes the normally closed contacts to open. Again, in practice, it has been found that amplifier 11 is preferably a solid-state amplifier such as a transistor. The preferred circuit arrangement is one wherein the signal from modified rate gyro 10 causes the normally conducting transistor used as amplifier 11 to stop conducting permitting the relay contacts of control device 12 to open.

Since the invention is not in the particular arrangement of, or types of amplifier and control device used but rather in the overall coaction of the elements shown in this figure, together with the modifications in rate gyro 10 it is believed that a schematic diagram of stages 11 and 12 is unnecessary.

Referring now to FIGURE 2, the rate gyro component corresponding to the element designated by reference numeral 10 in FIGURE 1, is illustrated. This component consists of a housing 13 containing therewithin a driven wheel 14 supported by and enclosed within a gimbal 15. The driven wheel 14 is illustrated as supported by a pair of extensions of the gimbal designated as arms 16 and 17, the wheel being mounted on a shaft 18 extending therebetween. In its simplest form gimbal 15 is shown supported at one end by a pin and bearing structure indicated at reference numeral 19 and at its other end by a linear spring device 20, in this embodiment a torsion bar. Fixed to gimbal 15 is at least one contact pin 21. In practice it has been found advantageous, from the point of view of subsequent adjustment, to use two such contact pins and a second is shown at reference numeral 22.

The area between gimbal 15 and housing 13 is filled with a damping fluid 23 such as silicone oil, gimbal 15 being sealed against penetration of damping fluid 23. Provided in the end portion 24 of housing 13 are a pair of apertures, one being identified by reference numeral 25, each of which communicates with the interior of housing 13. Each of apertures 25 are fitted with an insulating structure or sleeve 26 and 27 terminating in a collar 28, one of which is not shown to facilitate the description. Extending through and within each of sleeves 26 and 27 is a contact arm 29 and 30 respectively. Contact arms 29 and 30 are thus electrically isolated from housing 13.

Arms 29 and 30 are formed in the manner shown to enable their precise adjustment relative to their corresponding contact points 21 and 22 after housing 13 is sealed. Since arms 30 and 31 are identical a discussion of one of them will be sufficient. Arm 30, as is seen, includes a shaft portion 31 terminating at each end in bent portions 32 and 33. With arms 29 and 30 in place within their respective sleeves 26 and 27 and housing 13 sealed to contain damping fluid 23, the unit is mounted on conventional test apparatus which can supply a known angular input rate to the gyro. At this point, assuming that the angular input rate supplied by the test apparatus is the desired limit and that it will tend to rotate gimbal 15 in the direction of the arrow, i.e. counterclockwise, the solder sealing and restraining arm 29 within sleeve 26 and collar 28 is loosened by the application of heat. Now the end of arm 29 within housing 13 may be adjusted so that it just makes contact with contact pin 21 by rotating the end of arm 29 external to the housing. Thereupon the solder is permitted to harden, once again securing arm 29 in place. This procedure is repeated with arm 30, the angular input rate now being applied so as to cause gimbal 15 to rotate in a clockwise direction. The external ends 33 of the contact arms 29 and 30 may then be clipped to desired length. Instead of adjustment while a known rate is applied a trial and error technique can be used involving adjustment then application of rate, readjustment, repeated application of rate, etc.

It will be appreciated that the adjustment may be made as critical and precise as desired, the degree of precision depending primarily on the accuracy of the test apparatus. It will further be appreciated that contact pins 21 and 22 serve as mechanical stops, limiting excessive rotation of the rate gyro gimbal 15, and maintaining the connection between one of contact pins 21 or 22 and its associated arm 29 or 30 so long as the rate input exceeds the predetermined maximum.

Just as it is possible to construct the modified rate gyro portion of the limit switch using only one contact pin and two contact arms, it is also possible to do so using two contact pins and a single contact arm, positioned between the pins. Also, it should be noted, that a simpler device, responsive to an angular rate input in only a single direction, could be made using a single contact pin and a single contact arm.

As was pointed out above, the problem of completing contact between contact pins 21 or 22 and corresponding contact arms 29 or 30 is complicated by the presence of damping fluid 23 since typically used fluids, such as silicone oil, have a relatively low voltage/current breakdown characteristic. Accordingly, it has been found desirable to limit the contact current to approximately 0.5 milliampere and the contact voltage to approximately 0.5 volt. Since, in the embodiment described, the control relay requires a current in the order of 50 times the contact current, i.e., 25 milliamperes, and a voltage on the order of 12 volts, an amplifier 11 (FIG. 1) such as a transistor is connected between the modified rate gyro structure shown in FIGURE 2 and control device 12 (FIG. 1).

In the embodiment illustrated, the circuit employed was designed so that completion of one of the two contacts 21–29 or 22–32, would ground the base of an NPN transistor causing relay contacts in the control device to open interrupting the signal to the controlled device. This, in turn, could cause a disengagement or actuation of other safeguarding mechanism on the controlled device.

While what has been shown and described above is believed to be the best mode of and a preferred embodiment of the invention, it will be clear to those skilled in the art that variations and modifications may be made therein without departing from the spirit of the invention. For example, instead of using one or more contact pins 21, 22 one or more contact plates could be provided, the ends of contact arms 29, 32 being normally in contact with such plate or plates and moving off the plate, breaking the contact when sufficient rotation of gimbal 15 occurs. Also, amplifier (FIG. 1) need not be an NPN type but could be a PNP type and need not be normally conducting but could be normally non-conducting. Accordingly, the scope of the invention is intended to be limited solely by the appended claims.

What is claimed is:

1. A limit switch component including in combination a rate gyroscope having a driven wheel, means for driving said wheel, a gimbal rotatably supporting and enclosing said wheel, a sealed housing enclosing said wheel and said gimbal, means rotatably supporting said gimbal within said housing, linear spring means within said housing yieldably restraining the rotation of said gimbal about the gimbal axis, said gimbal rotating about the gimbal axis against the force of said linear spring means in response to an angular rate input applied thereto, at least one contact pin fixed to said gimbal, at least one contact arm extending through a surface of said housing and positioned to be normally out of contact with said contact pin, a damping fluid within said housing, said contact arm being positioned so that rotation of said gimbal about said gimbal axis will move said contact pin toward and into contact with said contact arm, and means for adjusting the degree of rotation required of said gimbal to move said contact pin into contact with said contact arm after said housing is sealed.

2. A limit switch component including in combination a rate gyroscope having a driven wheel, means for driving said wheel, a gimbal rotatably supporting and enclosing said wheel, a sealed housing enclosing said gimbal, means rotatably supporting said gimbal within said housing, a torsion bar yieldably restraining the rotation of said gimbal about said gimbal axis, said gimbal rotating about the gimbal axis against the force of said torsion bar in response to an angular rate input applied thereto, a contact portion fixed to said gimbal, at least an aperture formed in said housing and communicating with the interior thereof, a contact arm extending through at least one of said apertures and positioned to be normally in contact with said contact portion, means electrically isolating each of said contact arms from said housing, and means for adjusting the degree of rotation required to move said contact portion out of contact with said contact arm after said housing is sealed.

3. A limit switch component including in combination a rate gyroscope having a driven wheel, means for driving said wheel, a gimbal rotatably supporting and enclosing said wheel, a sealed housing enclosing said gimbal, means rotatably supporting said gimbal within said housing, a torsion bar yieldably restraining the rotation of said gimbal about said gimbal axis, said gimbal rotating about the gimbal axis against the force of said torsion bar in response to an angular rate input applied thereto, a contact pin fixed to said gimbal, at least an aperture formed in said housing and communicating with the interior thereof, a contact arm extending through at least one of said apertures and positioned to be normally out of contact with said contact pin, means electrically isolating each of said contact arms from said housing, and means for adjusting the degree of rotation required to move said contact pin into contact with said contact arm after said housing is sealed.

4. A limit switch component including in combination a rate gyroscope having a driven wheel, means for driving said wheel, a gimbal rotatably supporting and enclosing said wheel, a sealed housing enclosing said gimbal, means rotatably supporting said gimbal within said housing, first and second contact pins fixed to said gimbal, a torsion bar within said housing yieldably restraining the rotation of said gimbal, said gimbal rotating about the gimbal axis in response to the application of an angular rate input thereto, first and second apertures formed in one end of said housing and communicating therethrough, an insulating sleeve within each of said apertures, a contact arm sealed within each of said sleeves and extending from the exterior of said housing to the interior thereof, said insulating sleeve electrically isolating said contact arms from said housing, each of said contact arms having the end within said housing bent at an angle to the body of said contact arm, means for sealing said arms within said sleeve, and means for adjusting the location of the bent portion of each of said arms relative to its associated contact pin after said arms have been sealed within said sleeves.

5. A limit switch component including in combination a rate gyroscope having a driven wheel, means for driving said wheel, a gimbal rotatably supporting and enclosing said wheel, a sealed housing enclosing said gimbal, means rotatably supporting said gimbal within said housing, first and second contact pins fixed to said gimbal, a torsion bar within said housing yieldably restraining the rotation of said gimbal, said gimbal rotating about the gimbal axis in response to the application of an angular rate axis in response to the application of an angular rate input thereto, first and second apertures formed in one end of said housing and communicating therethrough, an insulating sleeve within each of said apertures, a contact arm sealed within each of said sleeves and extending from the exterior of said housing to the interior thereof, said insulating sleeve electrically isolating said contact arms from said housing, each of said contact arms having the end within said housing bent at an angle to the body of said contact arm, means for sealing said arms within said sleeve, means for adjusting the location of the bent portion of each of said arms relative to its associated contact pin after said arms have been sealed within said sleeves, said last named means including a second portion of each of said contact arms external to said housing bent at an angle to the body of said contact arm whereby rotation of said external bent portion will rotate said internal bent portion toward or away from its associated contact pin while a known angular rate input is applied.

6. In combination a rate gyroscope having a driven wheel, means for driving said wheel, a gimbal rotatably supporting and enclosing said wheel, a sealed housing enclosing said wheel and said gimbal, means rotatably supporting said gimbal within said housing, linear spring means within said housing yieldably restraining the rotation of said gimbal about the gimbal axis, said gimbal rotating about the gimbal axis against the force of said linear spring means in response to an angular rate input applied thereto, at least one contact pin fixed to said gimbal, at least one contact arm extending through a surface of said housing and positioned to be normally out of contact with said contact pin, a damping fluid within said housing, said contact arm being positioned so that rotation of said gimbal about said gimbal axis will move said contact pin toward and into contact with said contact arm, means for adjusting the degree of rotation required of said gimbal to move said contact pin into contact with said contact arm after said housing is sealed, a control device external to said housing and responsive to signals applied thereto to provide a desired result, and means external to said housing connecting said contact arm to said control device, said last named means including an amplifier.

7. A limit switch including in combination a rate gyroscope having a driven wheel, means for driving said wheel, a gimbal rotatably supporting and enclosing said wheel, a sealed housing enclosing said gimbal, means rotatably supporting said gimbal within said housing, a torsion bar yieldably restraining the rotation of said gimbal about said gimbal axis, said gimbal rotating about the gimbal axis against the force of said torsion bar in response to an angular rate input applied thereto, a contact pin fixed to said gimbal, at least an aperture formed in said housing and communicating with the interior thereof, a contact arm extending through at least one of said apertures and positioned to be normally out of contact with said contact pin, means electrically isolating each of said contact arms from said housing, means for adjusting the degree of rotation required to move said contact pin into contact with said contact arm after said housing is sealed, a control device external to said housing and responsive to signals applied thereto to produce a desired result, and means external to said housing connecting said contact arm to said control device, said last named means including a normally conductive amplifier which is rendered non-conductive when said contact arm is in contact with its associated contact pin.

8. A limit switch including in combination a rate gyroscope having a driven wheel, means for driving said wheel, a gimbal rotatably supporting and enclosing said wheel, a sealed housing enclosing said gimbal, means rotatably supporting said gimbal within said housing, first and second contact pins fixed to said gimbal, a torsion bar within said housing yieldably restraining the rotation of said gimbal, said gimbal rotating about the gimbal axis in response to the application of an angular rate input thereto, first and second apertures formed in one end of said housing and communicating therethrough, an insulating sleeve within each of said apertures, a contact arm sealed within each of said sleeves and extending from the exterior of said housing to the interior thereof, said insulating sleeve electrically isolating said contact arms from said housing, each of said contact arms having the end within said housing bent at an angle to the body of said contact arm, means for sealing said arms within said sleeve, means for adjusting the location of the bent portion of each of said arms relative to its associated contact pin after said arms have been sealed within said sleeves, a control device external to said housing and responsive to the change in a signal applied thereto to produce a desired result, and means external to said housing connecting each of said contact arms to said control device, said last named means including an amplifier effective when one of said contact arms touches its associated contact pin to change the normal signal level applied from said amplifier to said control device.

9. A limit switch component including in combination a rate gyroscope having a driven wheel, means for driving said wheel, a gimbal rotatably supporting and enclosing said wheel, a sealed housing enclosing said gimbal, means rotatably supporting said gimbal within said housing, a torsion bar yieldably restraining the rotation of said gimbal about said gimbal axis, said gimbal rotating about the gimbal axis against the force of said torsion bar in response to an angular rate input applied thereto, a contact portion fixed to said gimbal, at least an aperture formed in said housing and communicating with the interior thereof, a contact arm extending through at least one of said apertures and positioned to be normally in contact with said contact portion, means electrically isolating each of said contact arms from said housing, means for adjusting the degree of rotation required to move said contact portion out of contact with said contact arm after said housing is sealed, a control device external to said housing and responsive to change and signal applied thereto to produce a desired result, and means external to said housing connecting said contact arm to said control device.

References Cited by the Examiner

UNITED STATES PATENTS

| | | | |
|---|---|---|---|
| 2,690,014 | 9/1954 | Draper et al. | 74—5.6 X |
| 2,794,345 | 6/1957 | Conway | 74—5.6 |
| 2,821,087 | 1/1958 | Hammon | 74—5.34 X |

FRED C. MATTERN, Jr., *Primary Examiner.*

BROUGHTON G. DURHAM, *Examiner.*

T. W. SHEAR, *Assistant Examiner.*